(12) United States Patent
Park

(10) Patent No.: US 7,499,799 B2
(45) Date of Patent: Mar. 3, 2009

(54) APPARATUS AND METHOD FOR DOWNLOADING AND DISPLAYING IMAGES RELATING TO GLOBAL POSITIONING INFORMATION IN A NAVIGATION SYSTEM

(75) Inventor: Young-Sik Park, Daegu (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 162 days.

(21) Appl. No.: 10/859,165

(22) Filed: Jun. 3, 2004

(65) Prior Publication Data

US 2005/0004749 A1 Jan. 6, 2005

(30) Foreign Application Priority Data

Jun. 3, 2003 (KR) .................... 10-2003-0035751

(51) Int. Cl.
*G06F 7/00* (2006.01)
*G01C 21/30* (2006.01)
*G08G 1/0968* (2006.01)
*G08G 1/0969* (2006.01)

(52) U.S. Cl. .................. 701/208; 701/211; 701/300; 340/995.12; 340/995.24; 340/995.28

(58) Field of Classification Search ......... 345/200–205; 340/905, 988, 989, 990–996; 701/200, 206, 701/207, 211, 1, 208, 209, 212, 213
See application file for complete search history.

(56) References Cited

U.S. PATENT DOCUMENTS

| | | | |
|---|---|---|---|
| 6,199,014 B1 * | 3/2001 | Walker et al. ................ | 701/211 |
| 6,233,523 B1 * | 5/2001 | Sood ........................... | 701/213 |
| 6,314,360 B1 * | 11/2001 | Becker ........................ | 701/117 |
| 6,321,158 B1 * | 11/2001 | DeLorme et al. ............ | 701/201 |
| 6,360,168 B1 * | 3/2002 | Shimabara .................. | 701/211 |
| 6,611,753 B1 * | 8/2003 | Millington .................. | 701/209 |
| 6,662,016 B1 * | 12/2003 | Buckham et al. ............ | 455/457 |
| 6,735,515 B2 * | 5/2004 | Bechtolsheim et al. ...... | 701/208 |
| 6,885,939 B2 * | 4/2005 | Schmidt et al. ............. | 701/211 |
| 6,891,561 B1 * | 5/2005 | Achituv et al. ................ | 348/36 |
| 6,965,828 B2 * | 11/2005 | Pollard ....................... | 701/213 |

(Continued)

FOREIGN PATENT DOCUMENTS

EP 0 406 946 A1 1/1991

(Continued)

*Primary Examiner*—Jack W Keith
*Assistant Examiner*—Edward Pipala
(74) *Attorney, Agent, or Firm*—Roylance, Abrams, Berdo & Goodman, LLP

(57) ABSTRACT

An apparatus and method for a navigation system including an information center and a mobile terminal is disclosed. The information center stores node image information on topographic features of a node. The node image information includes partial image information according to a direction of movement of the mobile terminal. The information center includes a database for storing a node message having the partial image information and a database for storing map data. The information center generates the node message for guiding the next node point whenever the mobile terminal reaches a node point, and transmits partial image information of the node image information corresponding to the direction of movement of the mobile terminal. The mobile terminal displays the image information of the node received at each node point and confirms a movement path.

7 Claims, 12 Drawing Sheets

U.S. PATENT DOCUMENTS

| | | | | |
|---|---|---|---|---|
| 2002/0069013 | A1 | 6/2002 | Navab et al. | 701/200 |
| 2002/0075323 | A1 | 6/2002 | O'Dell | 345/835 |
| 2002/0165665 | A1* | 11/2002 | Kim | 701/209 |
| 2004/0039523 | A1* | 2/2004 | Kainuma et al. | 701/208 |

FOREIGN PATENT DOCUMENTS

| | | |
|---|---|---|
| EP | 0 579 451 A1 | 1/1994 |
| JP | 09325042 | 12/1997 |
| WO | WO 99/39160 | 8/1999 |

* cited by examiner (a) (b)

APPARATUS AND METHOD FOR DOWNLOADING AND DISPLAYING IMAGES RELATING TO GLOBAL POSITIONING INFORMATION IN A NAVIGATION SYSTEM

PRIORITY

This application claims the benefit under 35 U.S.C. § 119 (a) of an application entitled "Apparatus and method for downloading and displaying images relating to global position information in navigation system" filed in the Korean Intellectual Property Office on Jun. 3, 2003 and assigned Serial No. 2003-35751, the entire contents of which are incorporated herein by reference.

BACKGROUND OF THE INVENTION

1. Field of the Invention

The present invention relates to an apparatus and a method for downloading and displaying an image signal. More particularly, the present invention relates to an apparatus and a method for downloading and displaying an image signal relating to position information in a geographic information system.

2. Description of the Related Art

Communication terminals provided with global positioning system (hereinafter, referred to as a GPS) equipments typically determine their position through signals received from the GPS. Further, navigation systems using the GPSs are new, and the use of such navigation systems is increasing. The navigation systems as described store map information in storage media such as compact discs (CDs). Further, when the navigation systems move, the GPSs confirm positions of the moving navigation systems and output the confirmed position information to the navigation systems. Then, the navigation systems display their moving positions on maps according to the received GPS information. Further, the navigation systems download map information and their position information from the GPS, and display their moving positions on the maps according to the received GPS information. Herein, the navigation systems may be navigators of vehicles or mobile communication terminals.

However, the navigation system as described displays its current position on a map shown on a plane, such as two-dimensional or simulated three-dimensional plane, on a display unit of the navigation system. Further, the conventional navigation systems display their own positions on planar maps by means of position information received from the GPS. Accordingly, it is difficult to accurately comprehend a panoramic view of an area in which the navigation system is located using such display methods.

SUMMARY OF THE INVENTION

Accordingly, the present invention has been made to solve the above-mentioned problems occurring in the prior art. A first object of the present invention is to provide an apparatus and a method for downloading and displaying topographic image information corresponding to positions in which a navigation system moves.

A second object of the present invention is to provide an apparatus and a method capable for downloading and displaying panorama topographic image information according to positions in which a navigation system moves.

A third object of the present invention is to provide an apparatus and a method for downloading a panorama image of topographic features according to positions in which a navigation system moves, and downloading and displaying image information according to the direction of movement of the navigation system when the panorama image is downloaded.

A fourth object of the present invention is to provide an apparatus and a method for downloading and displaying in real time map information and panorama image information of topographic features according to positions in which a navigation system moves, and downloading image information in other positions different from the direction of movement of the navigation system.

In order to accomplish the aforementioned object, according to one aspect of the present, there is provided a method for transmitting a node message from an information center to a mobile terminal in a navigation system including the information center and the mobile terminal. The information center stores node image information on topographic features of a node. The node image information includes partial image information according to a direction of movement of the mobile terminal. The information center includes a database for storing the node message having the partial image information and a database for storing map data. The method comprises generating the node message for guiding a next node point whenever the mobile terminal reaches a node point; confirming the direction of movement of the mobile terminal and transmitting partial image information of the node image information corresponding to the direction of movement of the mobile terminal; and sequentially transmitting partial image information in a direction adjacent to the direction of movement of the mobile terminal after the image information in the direction of movement of the mobile terminal has been transmitted.

In order to accomplish the aforementioned object, according to one aspect of the present, there is provided a method for allowing a mobile terminal to display a node message in a navigation system including an information center and the mobile terminal. The information center stores node image information on topographic features of a node. The node image information includes partial image information according to a direction of movement of the mobile terminal. The node information center includes a database for storing the node message having the partial image information and a database for storing map data. The method comprises transmitting movement information of the mobile terminal to the information center until the node message is received; receiving the node message for guiding a next node point transmitted from the information center whenever the mobile terminal reaches a node point; displaying image information of the next node when the partial image information of the node image information corresponding to the direction of movement of the mobile terminal has been received from the received node message; and sequentially receiving and storing partial image information in a direction adjacent to the direction of movement of the mobile terminal while the image information in the direction of movement of the mobile terminal is displayed, and returning to the step of transmitting the movement information of the mobile terminal.

In order to accomplish the aforementioned object, according to one aspect of the present, there is provided a method for downloading and displaying a node message in a navigation system including an information center and the mobile terminal. The information center stores node image information on topographic features of a node. The node image information includes partial image information according to a direction of movement of the mobile terminal. The node information center includes a database for storing the node message having the partial image information and a database for storing map data. The method comprises the mobile terminal transmitting movement information to the information center, and the information center analyzing the movement information of the mobile terminal and determining whether the mobile terminal has arrived at a node point; the information center generating the node message for guiding a next node point when detecting the arrival of the mobile terminal, and transmitting partial image information of the node image information corresponding to the direction of movement of the mobile terminal; the mobile terminal receiving the node message transmitted from the information center, and displaying image information of the next node when completely receiving the partial image information of the node image information corresponding to its own direction of movement; and the information center sequentially transmitting partial image information in a direction adjacent to the direction of movement of the mobile terminal, the mobile terminal displaying the partial image information of the direction of movement, and the mobile terminal sequentially receiving and storing the partial image information, which has been transmitted from the information center, in the direction adjacent to the direction of movement of the mobile terminal.

In order to accomplish the aforementioned object, according to one aspect of the present, there is provided an information center apparatus of a navigation system. The information center comprises a map database for storing map data; an image information database for storing node image information of topographic features in a node, the node image information including partial image information according to a direction of movement of a mobile terminal; and a path server for calculating a travel path of the mobile terminal from a current position to a destination of the mobile terminal to transmit the map data, generating a node message for guiding a next node point whenever the mobile terminal reaches a node point, and transmitting partial image information of the node image information corresponding to the direction of movement of the mobile terminal.

In order to accomplish the aforementioned object, according to one aspect of the present, there is provided a navigation system comprising mobile terminals and an information center apparatus, wherein the information center apparatus includes a map database for storing map data; an image information database for storing node image information of topographic features of a node, the node image information including partial image information according to a direction of movement of a mobile terminal; and a path server for calculating a travel path of the mobile terminal from a current position to a destination of the mobile terminal to transmit the map data, generating a node message for guiding a next node point whenever the mobile terminal reaches a node point, and transmitting partial image information of the node image information corresponding to the direction of movement of the mobile terminal, and the mobile terminal includes: a Global Positioning System (GPS) receiver for receiving current position information of the mobile terminal from a GPS; a velocity sensor for detecting a movement speed of the mobile terminal; a control unit for transmitting the position information of the mobile terminal to the information center apparatus, receiving the node message of the next node point transmitted from the information center apparatus whenever the mobile terminal reaches a node point, and displaying the partial image information corresponding to the direction of movement of the mobile terminal; and a display unit for displaying image information output from the second control unit.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
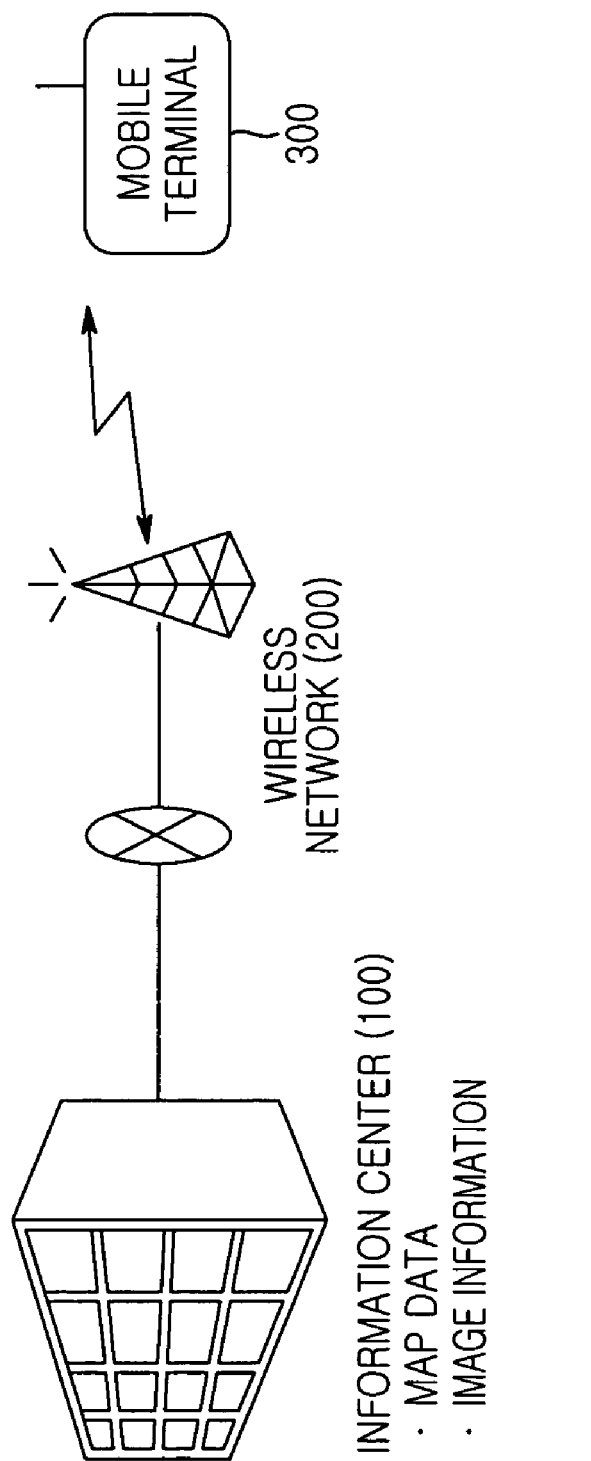
FIG. 1 is a view schematically showing a construction of a geographic information system (hereinafter, referred to as a navigation system) according to an embodiment of the present invention.

Hereinafter, a preferred embodiment according to the present invention will be described with reference to the accompanying drawings. In the following description of the present invention, a detailed description of known functions and configuration incorporated herein will be omitted for conciseness.

A navigation system according to an embodiment of the present invention receives its position information from a Global Positioning System (GPS), receives image information of topographic features in the received position information, and displays the received image information. Accordingly, the navigation system can confirm visually topographic features for the next position along the direction of movement of the navigation system. An embodiment of the present invention provides a navigation system for downloading and displaying the image information in the direction of movement of the navigation system. Further, in an embodiment of the present invention, it is assumed that the downloaded information is a panorama image, but the information also includes general information.

A navigation system according to an embodiment of the present invention receives its position information from a GPS, downloads panorama image information of topographic features corresponding to the position information from a data server (or GPS), and displays in real time the panorama image in all directions for advancing positions. Further, an embodiment of the present invention also includes a method for selectively downloading and reproducing the panorama image information according to the direction of movement of the navigation system, because a large quantity of data exists to be processed when the panorama image for all directions is reproduced. Furthermore, an embodiment of the present invention also includes a method by which a mobile terminal effectively receives and reproduces the whole panorama image or the partial panorama image as well as a current position, a direction of movement on a map, which are provided by the GPS, by means of priority. These methods can be applied to an online or offline virtual reality (VR) service using the position information and the panorama image.

In a navigation system according to an embodiment of the present invention, when a mobile terminal receives its position information from a GPS and transmits information according to movement of the mobile terminal to an information center, the information center transmits image information of topographic features according to the movement of the mobile terminal to the mobile terminal. That is, in the navigation system according to an embodiment of the present invention, when the mobile terminal receives the position information from the GPS, downloads in real time map data and the image information according to the movement of the mobile terminal from the information center, and displays the downloaded map data and image information. However, the map data may be stored in the mobile terminal or downloaded from the GPS. Further, the image information may be downloaded from another apparatus such as a GPS.

FIG. 1 is a view schematically showing a construction of a navigation system according to an embodiment of the present invention. As shown in FIG. 1, the navigation system provides a navigation function through a mobile terminal 300.

Referring to FIG. 1, the navigation system includes an information center 100, a wireless network 200, and the mobile terminal 300.

The information center 100 stores map data and other image information according to an embodiment of the present invention. Further, when the mobile terminal 300 makes a request for a navigation function, the information center 100 generates corresponding navigation information referring to the map data and image information stored therein and then provides the mobile terminal 300 with the generated map data and image information through the wireless network 200. For instance, when the mobile terminal 300 makes a request for a guidance of an optimum path from a current position to a destination of a vehicle, the information center 100 transmits the map data to the mobile terminal 300, and then transmits in real-time image information for topographic features in a corresponding position to the mobile terminal 300 according to movement of the mobile terminal 300.

The wireless network 200 functions as a path of information transmission between the information center 100 and the mobile terminal 300. Herein, currently widely used personal communication system (PCS)-based communication systems or an IS-95A, 95B, and 95C-based digital cellular systems may be used as the wireless network 200. Further, recent code division multiple access (CDMA)-based digital cellular systems, such as international mobile telecommunications (IMT)-2000 or universal mobile telecommunication systems (UMTS), which have been widely developed, may be used as the wireless network 200.

The mobile terminal 300 operates in a navigation mode for supporting navigation functions according to an embodiment of the present invention as well as in a conventional mode for providing a user with a voice communication service. In the navigation mode, the mobile terminal 300 is connected to the wireless network 200, receives various navigation information provided from the information center 100, and provides the user with the received navigation information.

In the navigation mode, the user can set the current position and the destination on the mobile terminal 300, and make a request for an optimum path to the information center 100. The optimum path may comprise the shortest distance between an origination and a destination, a path having the least traffic, and so on. In this manner, the user may be provided with information regarding the optimum path from the current position to the destination from the information center 100, according to a conventional navigation function. Herein, the user may set a facility name, a district category, an administrative section name, a telephone number, longitude and latitude, which designate the destination, by way of voice or text input. Further, in the navigation mode, the user connects to the information center 100 through the mobile terminal 300, and receives image information on surrounding facilities from the information center 100.

For instance, when the user sets the current position and the destination of the vehicle in the navigation mode of the mobile terminal 300, and makes a request for an optimum travel path to the information center 100, information on the setting is provided to the information center 100 through the wireless network 200. Then, in response to the request of the user, the information center 100 calculates the optimum travel path from the current position to the destination by referring to map data stored in the information center 100, and provides the mobile terminal 300 with node information for providing image information on topographic features, such as surrounding facilities, on the calculated optimum travel path through the wireless network 200. When the optimum travel path guidance information is received from the information center 100, the mobile terminal 300 provides the user with map information and image information of each node according to the optimum path audio-visually. Herein, the path guidance information visually provided is displayed on a display unit of the mobile terminal 300, and the path guidance information provided audibly is output through a speaker of the mobile terminal 300. In such a travel path guidance service, guidance direction indication, voice guidance, guidance sites, and information about a remaining distance to the destination are provided to the mobile terminal 300.

The navigation system in FIG. 1 employs an exemplary information center 100 and the mobile terminal 300 each of which transmits navigation information through the wireless network 200. However, the information center 100 and the mobile terminal 300 respectively have a GPS equipment, and transmit the navigation information through the GPS equipment to each other, so that a navigation system may be constructed without using the wireless network 200.

Figure 2:
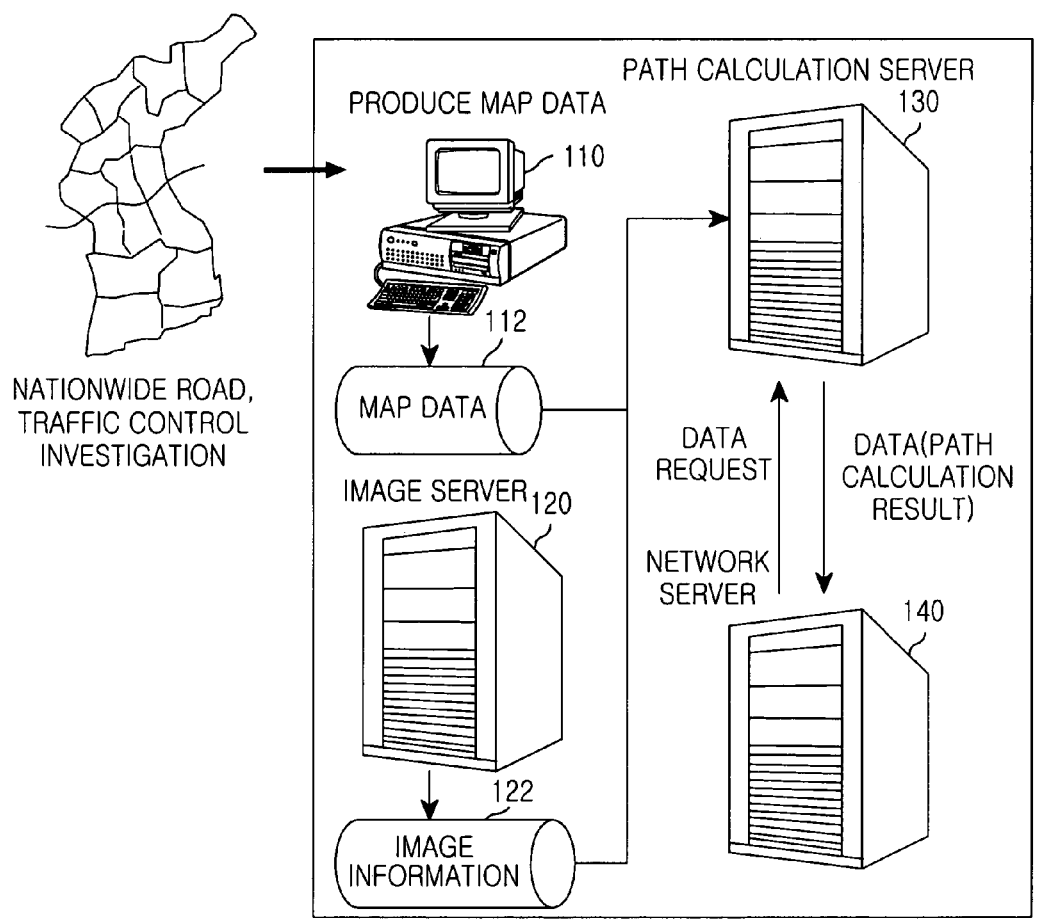
FIG. 2 is a view schematically showing a construction of an information center according to an embodiment of the present invention.

FIG. 2 is a view schematically showing a construction of the information center 100 according to an embodiment of the present invention.

Referring to FIG. 2, the information center 100 includes a computer 110, an image server 120, a path calculation server 130, a network server 140, a map data storage unit 112, and an image information storage unit 122. First, the computer 110 produces map data according to road and traffic control situations (e.g., nationwide roads, traffic control contents, etc) that were discovered in advance. The map data produced by the computer 110 are stored in the map data storage unit (or map data database) 112. Next, the image server 120 takes a photograph of topographic features of each main spot on a map, generates image information on the basis of the result of the photographing, and stores image information corresponding to a movement position of the mobile terminal 300 in the image information storage unit 122. Herein, the real time image information is image information of topographic features on a main node in the direction of movement of the mobile terminal 300. When there exists a data request from the network server 140, the path calculation server 130 calculates an optimum path, along which the mobile terminal 300 is to move, from the current position to the destination with reference to the map data and the image information respectively stored in the map data storage unit 112 and the image information storage unit 122. Then, the path calculation server 130 generates image information about facilities of the main nodes during the movement of the mobile terminal 300 while guiding the mobile terminal 300 to the optimum path according to the result of calculation. Last, the network server 140 is used in a connection with the wireless network 200.

As described above, the information center 100 stores the map data and the image information, and transmits in real time the map data for guiding the optimum path, into which the mobile terminal 300 will move, from the current position to the destination, and the photo image information of the main node, which must be passed through during the movement of the mobile terminal 300, to the wireless network 200. Herein, the nodes may be intersections, famous sights, main buildings, tollgates, interchanges, and sites around the destination.

When the mobile terminal 300 is connected to the wireless network 200 and transmits information about the current position and the destination of the vehicle to the wireless network 200, the wireless network 200 provides the information center 100 with the information transmitted from the mobile terminal 300. Further, the wireless network 200 provides the mobile terminal 300 with information for the optimum path provided from the information center 100 when the mobile terminal 300 makes a request for a download of the information for the optimum path. Such a wireless network 200 allows the mobile terminal 300 to be connected to the information center 100 in a wireless manner, and a wireless connection service to be provided to the mobile terminal 300. Herein, the wireless network 200 may be achieved by the existing CDMA-based digital cellular system or a PCS system. Further, the wireless network 200 may employ an IMT-2000 having been recently researched and developed.

Figure 3:
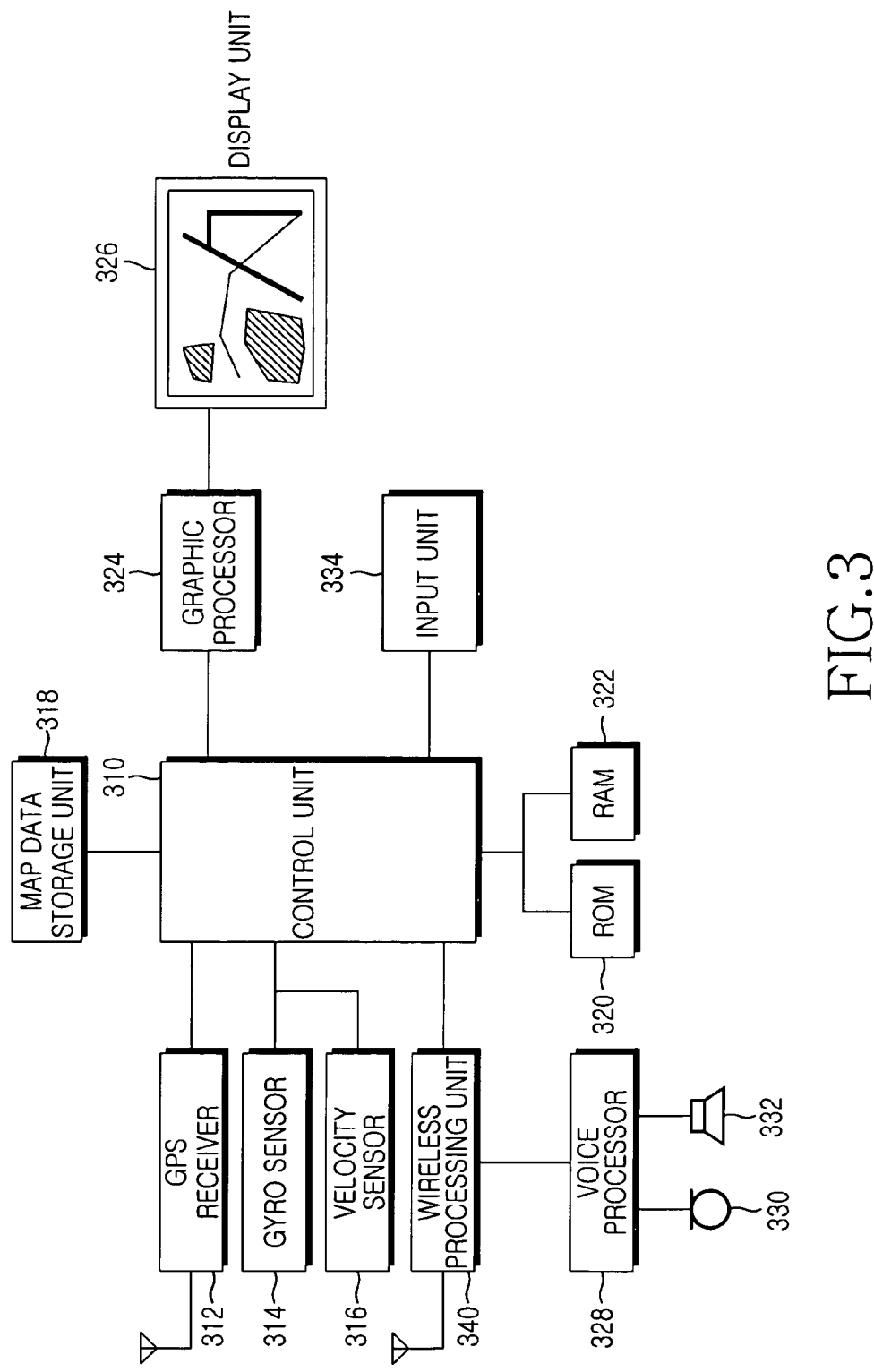
FIG. 3 is a block diagram showing a construction of the mobile terminal of FIG. 1.

FIG. 3 is a block diagram showing a construction of the mobile terminal 300 in FIG. 1. The mobile terminal having the construction as shown in FIG. 3 may be mounted on a vehicle or carried by a user. Further, the mobile terminal having the construction as shown in FIG. 3 employs an exemplary cell phone, however the mobile terminal may also employ a navigation equipment mounted on a vehicle.

Referring to FIG. 3, the mobile terminal 300 includes a GPS receiver 312, a gyro sensor 314, a velocity sensor 316, a map data storage unit 318, a control unit 310, a display unit 326, a graphic processor 324, a voice processor 328, a microphone 330, a speaker 332, a read only memory (hereinafter, referred to as a ROM) 320, and a random access memory (hereinafter, referred to as a RAM) 322.

The GPS receiver 312 receives radio waves from a plurality of satellites belonging to a GPS through an antenna, and the gyro sensor 314 and the velocity sensor 316 comprise a sensor unit. Herein, when the mobile terminal 300 is mounted on a vehicle, the gyro sensor 314 and the velocity sensor 316 each detect rotation speeds of wheels and movement speeds of the vehicle. In contrast, when the mobile terminal 300 is not mounted on a vehicle, outputs from the gyro sensor 314 and the velocity sensor 316 may not be used. Next, the map data storage unit 318 stores map data and addition information data. Herein, the map data may be output from the information center 100, and may be map data stored in storage media such as compact disk-read only memories (hereinafter, referred to as a compact disc (CD)-ROMs). In the case of the former, when a navigation mode is selected, the mobile terminal 300 makes a request for a download of map data to a desired destination to the information center 100, and stores the downloaded map data in the map data storage unit 318. In the case of the latter, the map data storage unit 318 may be achieved by the CD-ROM.

The control unit 310 controls a general operation of a mobile communication function and a navigation function.

In a first case in which a user carries the mobile terminal 300, the control unit 310 calculates a current position of the mobile terminal 300 on the basis of a current movement speed of the mobile terminal 300 detected by the sensor unit, and selects between a coordinate value in a current position transmitted from the GPS receiver 312 and the calculated position value. Herein, in selecting the value, when an accumulation error of the sensor unit is small, the calculated value is selected. In contrast, when the accumulation error grows larger, the accumulation error is compensated for by a value transmitted from the GPS receiver 312. Further, the control unit 310 calculates information such as a current position, a movement speed, and a direction of movement of the mobile terminal 300. Furthermore, the control unit 310 reads map data in an adjacent area from the map data storage unit 318 on the basis of the calculated movement information, displays the read map data on the display unit 326 visually, and outputs the read map data through the speaker 332 audibly.

In a second case in which the mobile terminal 300 is mounted on a vehicle, the control unit 310 calculates a current position of the vehicle on the basis of a rotation angle and a speed of the vehicle transmitted from the sensor unit, and selects between a coordinate value in a current position transmitted from the GPS receiver 312 and the calculated position value. Herein, in selecting the value, when an accumulation error of the sensor unit is small, the calculated value is selected. In contrast, when the accumulation error grows larger, the accumulation error is compensated for by a value transmitted from the GPS receiver 312. Further, the control unit 310 calculates travel information such as a current position, a speed, and a direction of movement of the vehicle. Furthermore, the control unit 310 reads map data of an adjacent area from the map data storage unit 318 on the basis of the calculated travel information, displays the read map data on the display unit 326 visually, and outputs the read map data through the speaker 332 audibly.

After calculating the movement information of the mobile terminal 300 as described above, the control unit 310 transmits position information depending on the movement of the mobile terminal 300 to the information center 100 through the wireless network 200. Then, the information center 100 calculates a movement path of the mobile terminal 300, accesses image information on the topographic features of the main node located on the movement path, and transmits the image information through the wireless network 200. Next, the control unit 310 of the mobile terminal 300 displays the received image information.

In addition to the basic functions, the control unit 310 guides the optimum path from the current position to the destination. The ROM 320 and the RAM 322 temporarily store programs for operation of the control unit 310 and data processed during the operations.

The graphic processor 324 converts the movement information calculated by the control unit 310 into display data capable of being visually confirmed by a user, and the display unit 326 displays the display data processed by the graphic processor 324. Such a display unit 326 may employ a cathode ray tube (CRT) or a liquid crystal display (LCD).

The voice processor 328 converts the travel information calculated by the control unit 310 into voice data capable of being audibly confirmed by the user, and the speaker 330 outputs the voice data processed by the voice processor 328. The graphic processor 324 and the voice processor 328 each convert the map data read from the map data storage unit 318 and data occurring during performance of various functions into the display data and the voice data.

Hereinafter, a schematic operation of the download and the display of the image information between the information center 100 and the mobile terminal 300 will be described with reference to the navigation system having the construction as described above.

First, an initial operation will be described. The initial operation is performed in the following sequence: selection of a navigation service function on the mobile terminal 300; the mobile terminal 300 connecting to the information center 100; the mobile terminal 300 transmitting its current position data and destination data to the information center 100; the information center 100 receiving and confirming service data of the mobile terminal 300; the information center 100 confirming an optimum movement path; and the information center 100 transmitting image information of the next node, through which the mobile terminal 300 is to pass, to the mobile terminal 300.

Secondly, an operation during travel will be described. The operation during travel is performed in the following sequence: storing node image information, which is provided by the information center 100 in each node position, in the memory of the mobile terminal 300; the mobile terminal 300 displaying partial image information in a movement direction from among the received image information; the mobile terminal 300 generating current position data by means of a GPS engine, the gyro sensor, and the velocity sensor while displaying the image information of the next node; and the mobile terminal 300 transmitting the current position data in real time to the information center 100. Such an operation is ended when the current position of the mobile terminal 300 is equal to a final destination.

Meanwhile, if the mobile terminal 300 deviates from the path during the movement, the mobile terminal 300 reconnects to the information center 100, and the information center 100 provides the mobile terminal 300 with current position data. Then, the mobile terminal 300 moves from the current position to the destination, receives the image information of each node, and displays the received information as described above.

Thirdly, an operation of the information center 100 will be described. The operation of the information center 100 is performed in the following sequence: confirming whether the user of the mobile terminal 300 is joined in the navigation service when navigation requirement information is received from the mobile terminal 300; recognizing the current position and the destination of the vehicle from the received data when the user is an identified subscriber; searching for the optimum path from the recognized current position to the destination with reference to a map database and a real time traffic information database; and generating path guidance data for guiding the optimum path and transmitting the path guidance data to a navigation terminal.

Figure 4:
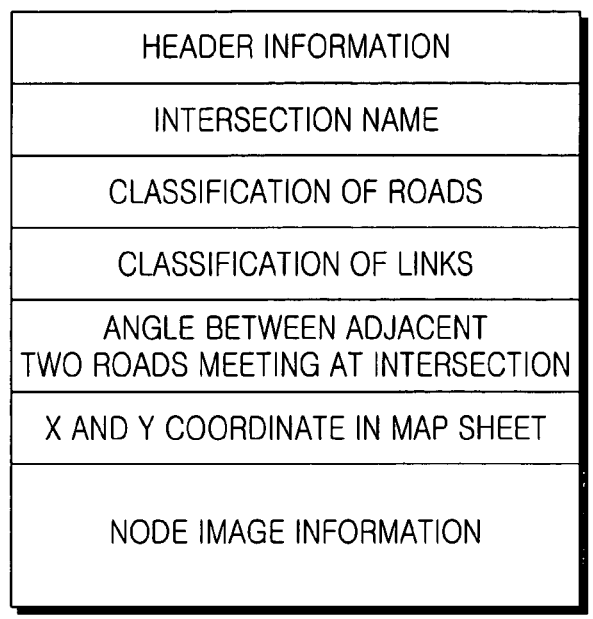
FIG. 4 is a view showing a format of a node message according to an embodiment of the present invention.

FIG. 4 is a view showing a structure of data for transmitting image information according to an embodiment of the present invention.

Referring to FIG. 4, a format of the data for transmitting the image information includes header information and information about a guidance point (node point). The guidance point information includes an intersection name, classification of roads, classification of links, an angle between adjacent two roads meeting at an intersection, an X and a Y coordinate in a map sheet, and image information of a corresponding node. First, the intersection name may comprise text data and as an example may be "Samsung Intersection." Next, the classification of roads is for classifying the types of roads and may be an express highway, a national highway, or a local highway. The classification of links is for classifying the types of links and may be an u-turn, a rotary, an over pass, an under pass, or a bridge. Then, the angle between adjacent two roads meeting at an intersection may be an entrance angle to or an exit angle from the intersection, or an angle of an exit road with respect to a line extending in a due north direction.

Last, the image information may be photograph images of facilities adjacent to the corresponding node, or 360° image information with respect to the four directions (the four cardinal points) of the corresponding node. In an embodiment of the present invention, the image information as described above is called a panorama image. The panorama image is obtained by photographing over 360° the facilities at a certain node and then storing the photographed image as image information in the node.

Figure 5:
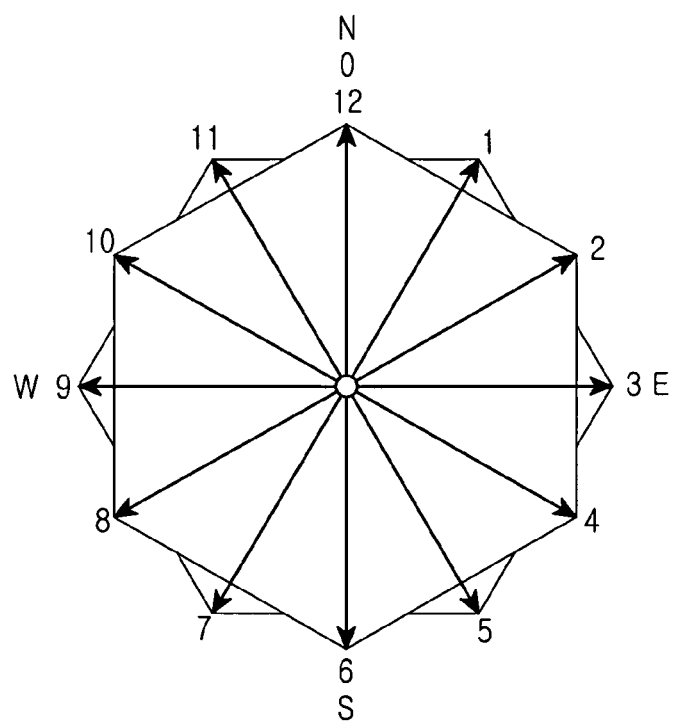
FIG. 5 shows all directions in a certain node and directions of movement of a mobile terminal.
Figure 6:
FIG. 6 shows one example of image information according to directions of movement as shown in FIG. 5, and shows an example of a panorama image when a node is an intersection.
Figure 7:
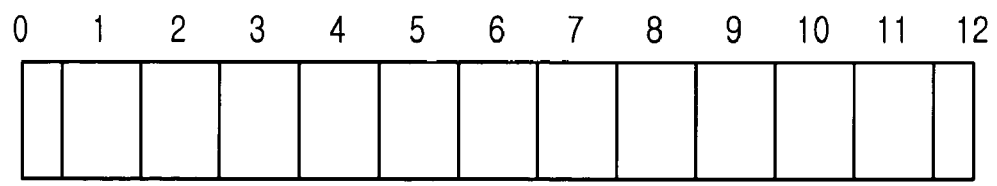
FIG. 7 shows partial images according to directions of movement in the panorama image as shown in FIG. 6.

FIG. 5 shows all directions in a certain node, and displays directions of movement of the mobile terminal 300. FIG. 6 shows one example of image information according to the directions of movement as shown in FIG. 5, and shows an example of a panorama image when a node is an intersection. Further, FIG. 7 shows partial images according to the directions of movement in the panorama image as shown in FIG. 6. The partial image in FIG. 7 has a structure corresponding to each movement direction in FIG. 5.

Referring to FIGS. 5 to 7, when the mobile terminal 300 transmits current position information, which has been received from the GPS, to the information center 100, the information center 100 analyzes prior position information of the mobile terminal 300 and the currently received position information, and determines the direction of movement of the mobile terminal 300. Further, the information center 100 transmits panorama image information of a node in the direction of movement of the mobile terminal 300. Herein, the transmitted panorama image information may be a panorama image of the next node through which the mobile terminal 300 is to pass. FIG. 5 shows the directions of movement of the mobile terminal 300. The directions of movement of the mobile terminal 300 may be divided into more detailed directions. However, in an embodiment of the present invention, a description will be given on an assumption that 360° is divided into 12 directions and a clockwise rotation is used as shown in FIG. 5. When a current direction of movement of the mobile terminal 300 in FIG. 5 is the 6 o'clock direction (due south), a panoramic view with respect to all directions can be understood in advance by means of a panorama image of an upcoming intersection. In FIG. 7, "0" in the left end and "12"

in the right end are images connected with each other, so that "0" to "12" can be used in a form like a circular band.

It is possible to reproduce real images with respect to all directions of the panorama image, but this requires an increase in the amount of and the processing time of data for transmitting the panorama image. Accordingly, when a quick movement is performed by means of a vehicle and a communication network having a limited transmission bandwidth is used, many limitations exist. Accordingly, the following cases may be considered with respect to a current position and direction of movement.

First, transmission of a panorama image for all directions will be described.

The transmission of a panorama image may employ a sequential transmission and reproduction method or a reproduction method of partial images according to direction of movement. The former method is employed when the information has no difference in its importance according to the direction of movement or transmission and reproduction processing speed are very fast, since it causes no problem to receive and reproduce the entire panorama image as shown in FIG. 6. Next, the latter method is employed when the information has difference in its importance according to the direction of movement or it is important to show some partial images prior to others in some directions of movement. For example, when the mobile terminal 300 moves in the 6 o'clock direction in FIG. 5, the partial images of the panorama image as shown in FIG. 6 may have priorities determined in a sequence of 6, 5, 7, 4, 8, 3, 9, 2, and then 10 o'clock directions.

Secondly, transmission of the partial images of the panorama image according to the direction of movement will be described.

The transmission of the partial images of the panorama image may employ a sequential transmission and reproduction method or a reproduction method by priority according to the direction of movement. The former method is employed when images within a limited angle are sequentially received and reproduced according to the direction of movement due to limitations in a data transmission bandwidth and a processing speed. The latter method is employed when priorities are given to images within a limited angle according to the direction of movement due to severe limitations in a data transmission bandwidth and a processing speed, the images are received according to the priorities, and the received images reproduced. For instance, when the mobile terminal 300 moves in the 6 o'clock direction in FIG. 5, the mobile terminal 300 may receive and reproduce only five images in 6, 5, 7, 4, and 8 o'clock directions in the panorama image according to the priorities according to the direction of movement.

Further, the panorama image having downloaded in the mobile terminal 300 may be automatically reproduced while being rotated. Furthermore, the mobile terminal 300 includes functions for stopping the image reproduction at a predetermined portion and magnifying/reducing the image through a zoom-in/zoom-out function, according to the request of a user.

Herein, the downloaded image information of the node as described above may be displayed together with the map data in various methods. That is, when the display unit 326 of the mobile terminal 300 has a large screen, there is no problem in displaying the map data and the image information. However, when the display unit 326 of the mobile terminal 300 has a small screen like a cell phone, there exists difficulty in displaying the map data and the image information. Accordingly, in an embodiment of the present invention, the map data and the photograph image are displayed using three methods below.

Figure 8A:
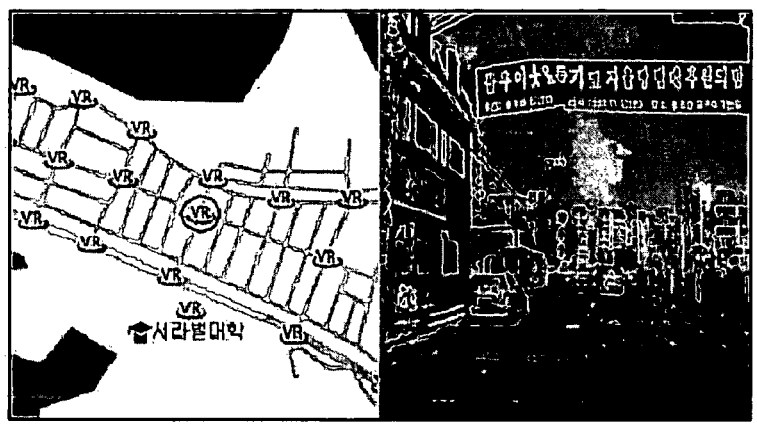
FIGS. 8A through 8C are images displaying map data and image information according to an embodiment of the present invention.

In the first method, the map data and the image are simultaneously displayed on one screen of the display unit 326 of the mobile terminal 300. That is, when the display unit 326 of the mobile terminal 300 has a large screen, or a user wants to see all of the map data and the whole image even though the display unit 326 of the mobile terminal 300 has a small screen, the map data and the image are simultaneously displayed as shown in FIG. 8A.

Figure 8B:

In the second method, the map data and the image overlap and are displayed as shown in FIG. 8B. That is, when a user wants to enlarge and see the map data and the image even though the display unit 326 of the mobile terminal 300 has a small screen, the method is performed. Further, weighted values of transparency may be adjusted in the course of blending two images.

Figure 8C:
Figure 8C:

In the third method, the map data and the image are sequentially displayed as shown in FIG. 8C. That is, the map data and the image are alternately displayed on the screen of the display unit 326 of the mobile terminal 300 so as to be clear. Herein, reproduction time and repetition period of the map data and the image may be determined.

Figure 9:
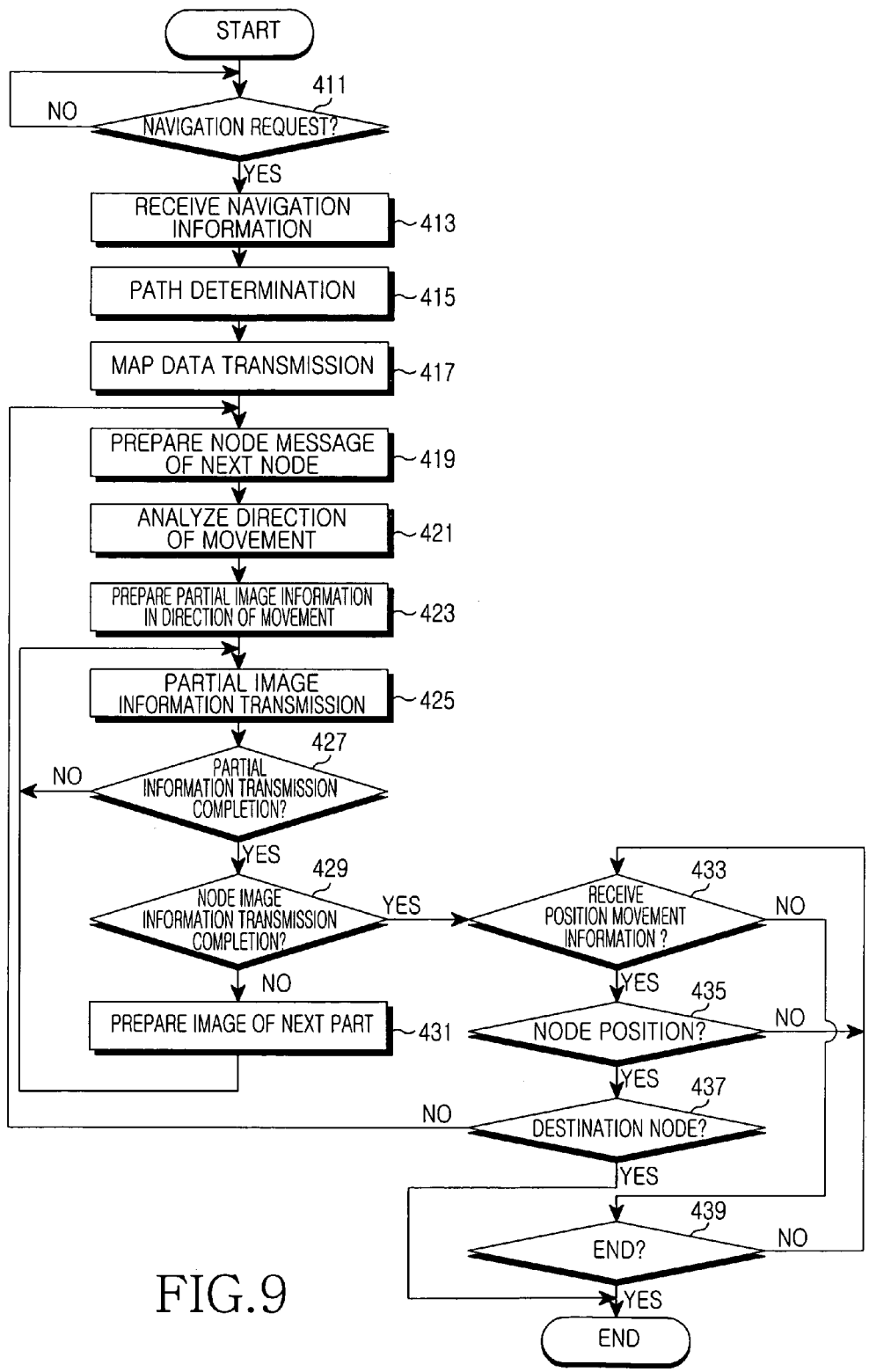
FIG. 9 is a flowchart illustrating an operation of an information center according to an embodiment of the present invention.

FIG. 9 is a flowchart illustrating an operation of the information center 100 according to an embodiment of the present invention.

Referring to FIG. 9, in step 411, the mobile terminal waits for a navigation request. If a navigation request signal is received from the mobile terminal 300, the information center 100 responds to the request. Then, in step 413, the information center 100 receives navigation information transmitted from the mobile terminal 300. Herein, the navigation information transmitted from the mobile terminal 300 includes the information on the current position and destination. The information on the current position of the mobile terminal 300 is the longitude and latitude coordinates obtained by the GPS receiver 312 of the mobile terminal 300. Further, the information on the destination may be facilities or an administrative section name of the destination input in the mobile terminal 300 in the form of a text or a voice by a user. Furthermore, the information on the destination may be a district category or a telephone number in addition to a name of the destination.

After receiving the information on the current position/destination transmitted from the mobile terminal 300, the information center 100 detects the current position and calculates a path in response to the reception, in step 415. The information center 100 performs the current position detection operation by receiving the information on the current position (longitude and latitude) and the destination of the mobile terminal 300, finding geographical name and facilities information items, which coincide with the current position, in the map data storage unit 112, and converting the items into longitude and latitude coordinates. Further, in the path calculation operation, the information center 100 sets an optimum path from the information on the current position and the destination of the mobile terminal 300 by means of the map data storage unit 112 and the image information storage unit 122.

Then, the information center 100 transmits map data including the obtained optimum path to the mobile terminal 300 through the wireless network 200 in step 417. Further, the information center 100 accesses a node message, which has a structure as shown in FIG. 4, with respect to the next node at a current position in step 419. Herein, the node message as shown in FIG. 4 may be information and image information of a corresponding node. That is, the node message is information of the next node to which the mobile terminal 300 is to move, and includes the header information, the intersection name of the corresponding node, the classification of roads, the classification of links, and the angle between two adjacent roads meeting at an intersection. Herein, the angle between two adjacent roads meeting at an intersection may be an entrance angle to or an exit angle from an intersection, or an angle of an exit road with respect to a line in a due north direction. Further, the image information of the node may be photograph images on facilities and topographic features adjacent to the node, and the image information may be the panorama image information as shown in FIG. 6. Herein, the panorama image becomes an image obtained by photographing over 360° the facilities and topographic features at the node. Further, it is assumed that the panorama image information is divided into 12 partial images according to directions as shown in FIG. 7. Herein, since the information center 100 must transmit a large quantity of data when transmitting the panorama image corresponding to the node position, the information center 100 transmits partial images corresponding to the direction of movement of the mobile terminal 300 prior to partial images in a direction adjacent to the direction of movement of the mobile terminal 300.

The information center 100 analyzes the direction of movement of the mobile terminal 300. That is, the information center 100 analyzes the current position of the mobile terminal 300 and a position of the destination, so that it analyzes the direction of movement of the mobile terminal 300 in step 421. Then, the information center 100 accesses partial image information corresponding to the analyzed direction of movement of the mobile terminal 300 in step 423, and transmits the partial image information to the mobile terminal 300 in step 425. For instance, when it is assumed that the mobile terminal 300 moves in the 6 o'clock direction, the information center 100 transmits the partial image in the 6 o'clock direction to the mobile terminal 300. Then, in step 427, the information center 100 determines whether the accessed partial images have been completely transmitted. As a result of this determination, when the accessed partial images have not been completely transmitted, step 425 is repeated. That is, the accessed partial images have been continuously transmitted. In contrast, when the accessed partial images have been completely transmitted, the information center 100 detects that the accessed partial images have been completely transmitted in step 427, and step 431 is performed. That is, the information center 100 prepares for partial image information in the next direction, and step 425 is repeated. That is, the information center 100 transmits the prepared partial image information. Accordingly, in transmitting the panorama image as shown in FIG. 6, when the mobile terminal 300 initially moves in the 6 o'clock direction, the information center 100 repeats steps 423 to 431, and transmits the partial images in a sequence of 6, 5, 7, 4, 8, 3, 9, 2, 10, 1, 11, and then 12 o'clock directions or 6, 7, 5, 8, 4, 9, 3, 10, 2, 11, 1, and then 12 o'clock directions.

The partial images are transmitted as described above, so that the panorama image information as shown in FIG. 6 is transmitted. Herein, when the panorama image information of the node as shown in FIG. 6 has been completely transmitted, the information center 100 detects that the panorama image information has been completely transmitted in step 429, and waits for the reception of position information of the mobile terminal 300 in step 433. Then, when the position information of the mobile terminal 300 is received, the information center 100 determines whether or not a current movement position of the mobile terminal 300 is a node position in step 435. As a result of the determination, when the position of the mobile terminal 300 is not the node position, step 433 is repeated. That is, the information center 100 waits for the reception of the position information of the mobile terminal 300. Then, when the mobile terminal 300 moves and reaches the node position, the information center 100 detects the arrival of the mobile terminal 300 in step 435 and proceeds to step 437 where a determination is made as to whether the mobile terminal 300 has arrived at its destination. The process returns to step 419 in order to transmit image information of the next node if the mobile terminal 300 has not reached its destination. That is, the information center 100 prepares for the node message as shown in FIG. 4 with respect to the next node, and then repeats the steps as described above.

When repeating the steps as described above, the mobile terminal 300 reaches the destination in step 437. Accordingly, when the mobile terminal 300 reaches all nodes corresponding to the destination, the information center 100 detects the arrival of the mobile terminal 300, and ends the procedure as described above. Further, when an ending signal is received while performing the operation as described above, the information center 100 detects the reception of the ending signal in step 439, and ends the procedure as described above.

Figure 10:
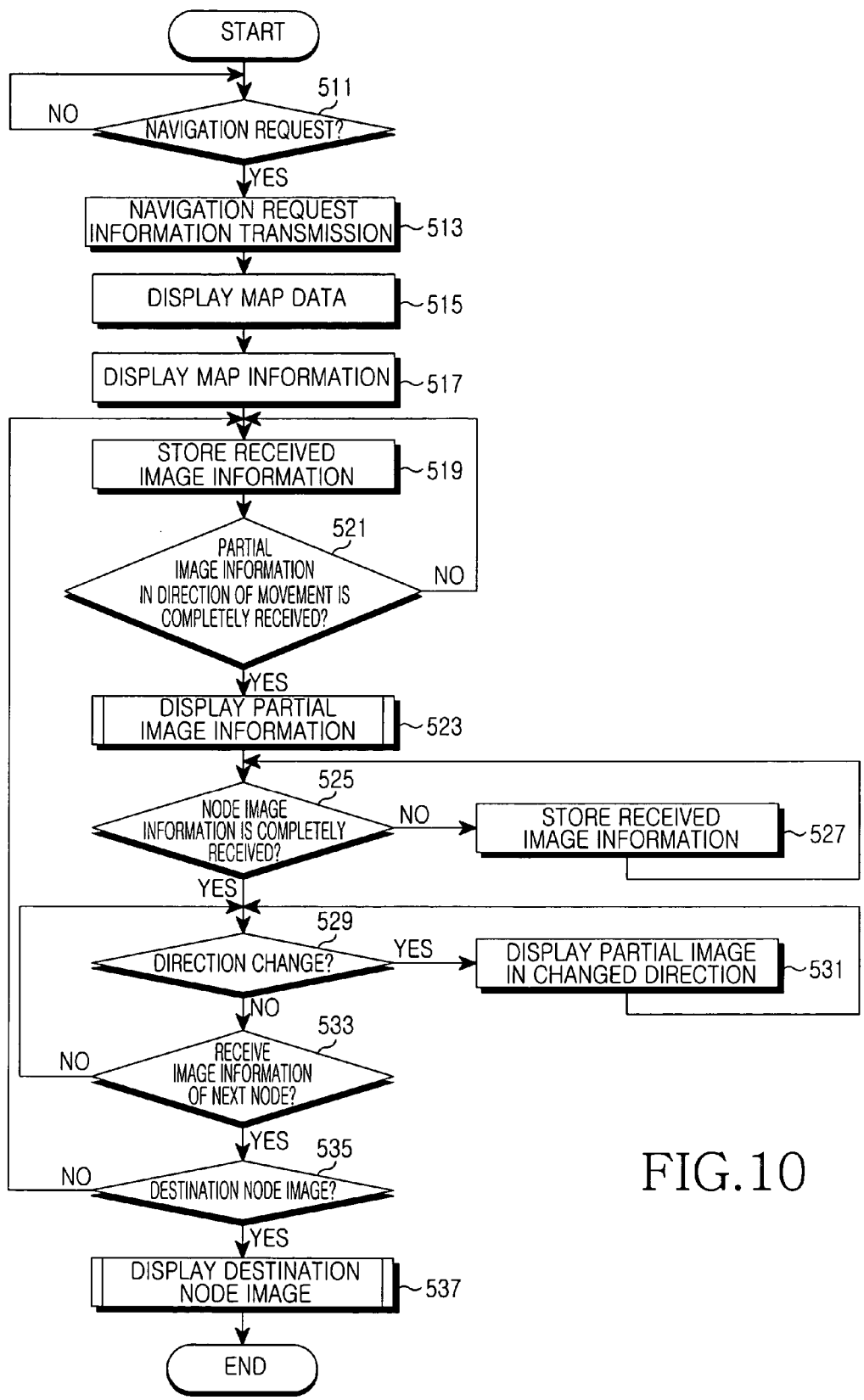
FIG. 10 is a flowchart illustrating a procedure for displaying the node image information transmitted by the mobile terminal as shown in FIG. 9.

When the information center 100 transmits the node message at each node through the procedure as described above, the mobile terminal 300 displays the node message transmitted from the information center 100 through the procedure as shown in FIG. 10.

Referring to FIG. 10, when a navigation request is received from a user, the mobile terminal 300 detects the reception of the navigation request in step 511. Then, the mobile terminal 300 confirms its current position from the GPS receiver 312, and generates and transmits a navigation request message including destination information input by the user. After transmitting the navigation request message, the mobile terminal 300 waits until the map data are received from the information center 100 in step 513. Then, when the map data are received from the information center 100, the mobile terminal 300 receives the map data in step 515, stores the received map data in the RAM 322, and controls the display unit 326 to display the received map data in step 517.

The mobile terminal 300 having displayed the map data receives the node message regarding the next node from the information center 100. When the node message is received, the mobile terminal 300 displays the received node message, displays the received image information of the node, and stores the received image information in step 519. Herein, the mobile terminal 300 determines whether the reception of the partial image information in its own direction of movement has ended while storing the received image information. That is, when transmitting the panorama image information, the information center 100 adds direction information to each partial image information of the panorama image information, and transmits the partial image information. Further, the mobile terminal 300 receives the partial image information. When the partial image information in the direction of movement of the mobile terminal 300 has been completely received, the mobile terminal 300 detects that the partial image information has been completely received in step 521, and displays the received partial image information in step 523. Herein, in step 521, the mobile terminal 300 receives the partial image information in the direction of movement and two partial image information in directions adjacent to the movement direction, and may display the received image information in step 523. That is, when the mobile terminal 300 moves in the 6 o'clock direction, the mobile terminal 300 receives the partial image information in the 6 o'clock direction and partial image information in the 5 and 7 o'clock directions, and may also display the received image information on one screen. Further, the mobile terminal 300 receives partial image information in the 4 and 8 o'clock directions together with the partial image information as described above, and may also display the received image information.

Herein, the mobile terminal 300 may display the map data and the image information as shown in FIGS. 8A through 8C. That is, in the first method, when the display unit 326 of the mobile terminal 300 has a large screen, or a user wants to display the map data and the image information simultaneously even though the display unit 326 has a small screen, the map data and the image information may be displayed on one screen of the display unit 326 as shown in FIG. 8A. In the second method, when a user wants to display the map data and the image information simultaneously even though the display unit 326 has a small screen, the two information may be blended with each other and displayed as shown in FIG. 8B. Herein, a weighted value is added in displaying the map data and the image information, so that the map data may be more clearly displayed than the image information, or the image information may be more clearly displayed than the map data. In the third method, the map data and the image are sequentially displayed on the screen of the display unit 326. That is, as shown in FIG. 8C, the map data and the image information may be alternately displayed on the limited screen of the display unit 326 so as to be large and clear. Herein, the map data and the image information can be variously displayed by allowing display time and repetition period of the map data to be different from those of the image information.

In a state in which the mobile terminal 300 receives and displays the image information in its own movement direction as described above, the mobile terminal 300 receives and stores partial image information in other directions transmitted from the information center 100, in step 525 and step 527. Further, when the reception and storage of the image information in the node have been completed, the mobile terminal 300 detects the completion of the reception and storage in step 525, and determines whether a direction change request signal has occurred. Herein, the direction change request represents a request of allowing a direction of the panorama image being stored to be changed and allowing the partial image information in other directions to be displayed. That is, in a state in which the mobile terminal 300 moves in the 6 o'clock direction, when a user wants to see image information in the 12 o'clock direction, the user of the mobile terminal 300 selects the image information in the 12 o'clock direction. Herein, the direction may be selected by using a numeral key or a direction key. Meanwhile, when the display unit 326 employs a touch screen type, the user may designate and set a display position. Then, the mobile terminal 300 accesses the partial image information in the established direction, and displays the partial image information in step 531. Further, the display of the partial image information in the changed direction may change again according to the setting of the user. When a predetermined time period lapses, the image information in the changed direction may be automatically changed as the partial image in the direction of movement of the mobile terminal 300. Further, when image information of the next node is received, the image information in the changed direction may be changed as the image information in the direction of movement of the mobile terminal 300 again, and the image information may be displayed.

As described above, while a state of displaying the partial image information in the direction of movement of the mobile terminal 300 or the direction selected by the user, the mobile terminal 300 passes through a node including image information being currently displayed, the information center 100 transmits the image information of the next node through which the mobile terminal 300 is to pass. Accordingly, when the image information of the next node is received from the information center 100, the mobile terminal 300 detects the reception of the image information in step 533, and step 519 is performed. That is, the mobile terminal 300 repeats the operation as described above. Herein, the image information of the next node may be stored in an area in which image information of a current node has been stored. However, when the mobile terminal 300 has a large memory area, the image information of the next node may be stored in another area of the current node. Further, since the received node message has the structure as shown in FIG. 4, the node message indicates the intersection name of the corresponding node, the classification of roads, the classification of links, the angles between adjacent two roads meeting at an intersection, and the position information in the map sheet before indicating the partial image information. Furthermore, the information as described above may be overlapped with the image information and displayed even in a state in which the image information is displayed.

While repeating the operation as described above, the mobile terminal 300 may display image information of each node on a map according to its own movement direction. Accordingly, the user may move while confirming photograph images on facilities and topographic features adjacent to each node with the naked eye. Further, the operation as described above is ended when the mobile terminal 300 reaches a desired destination node. That is, when the mobile terminal 300 reaches the desired destination node, the mobile terminal 300 detects the arrival in step 535, and displays the information of the destination node.

As shown in FIGS. 9 and 10, in the case of the panorama image for all directions, the transmission of the panorama image may employ a sequential transmission and reproduction method or a transmission and reproduction method by priority according to the direction of movement of the mobile terminal 300. The former method is employed when the information has no difference in its importance according to the direction of movement or transmission and reproduction processing speed are very fast, since it causes no problem to receive and reproduce the entire panorama image as shown in FIG. 6. Next, the latter method is employed when the information has difference in its importance according to the direction of movement or it is important to show some partial images prior to others in some directions of movement. Accordingly, in the latter method, the partial images according to the direction of movement of the mobile terminal 300 are first received and displayed, and priorities of all image information are determined according to the direction of movement of the mobile terminal 300, so that the sequence of transmission and reproduction with respect to the image information may be determined. FIGS. 9 and 10 shows procedures with respect to the latter method.

However, in the transmission and reproduction of the image information as described above, the mobile terminal 300 can receive and display all image information transmitted from the information center 100. The method is employed when the mobile terminal 300 has enough time to download the image information of the next node at a current node because the number of nodes from a starting point to a destination is small, or the mobile terminal 300 has a movement speed enough to completely download the image information of the node. Otherwise, when the mobile terminal 300 passes through a node, the mobile terminal 300 may not display image information of the node. Accordingly, when the mobile terminal 300 has a very high movement speed, or the number of nodes is large, it is preferred to receive and display only image information in the direction of movement of the mobile terminal 300 without downloading all image information of the corresponding node.

Accordingly, when the number of nodes is large or/and the mobile terminal 300 has a high movement speed, the mobile terminal 300 receives and displays the partial image information according to its own movement direction. Herein, either a sequential transmission and display method or a transmission and display method by priority according to movement directions may be employed.

Figure 11:
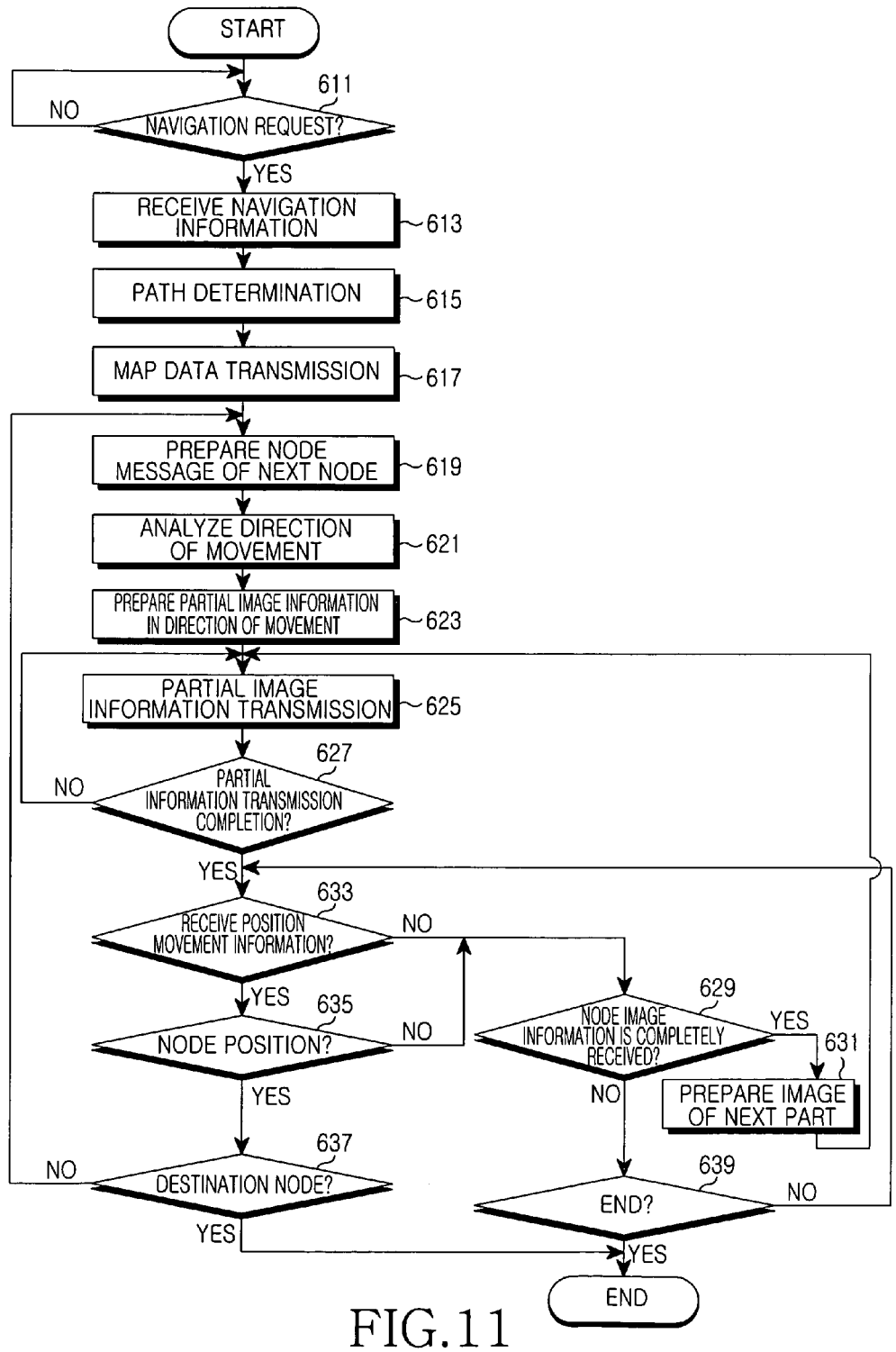
FIG. 11 is a flowchart illustrating an operation of an information center according to other embodiment of the present invention.
Figure 12:
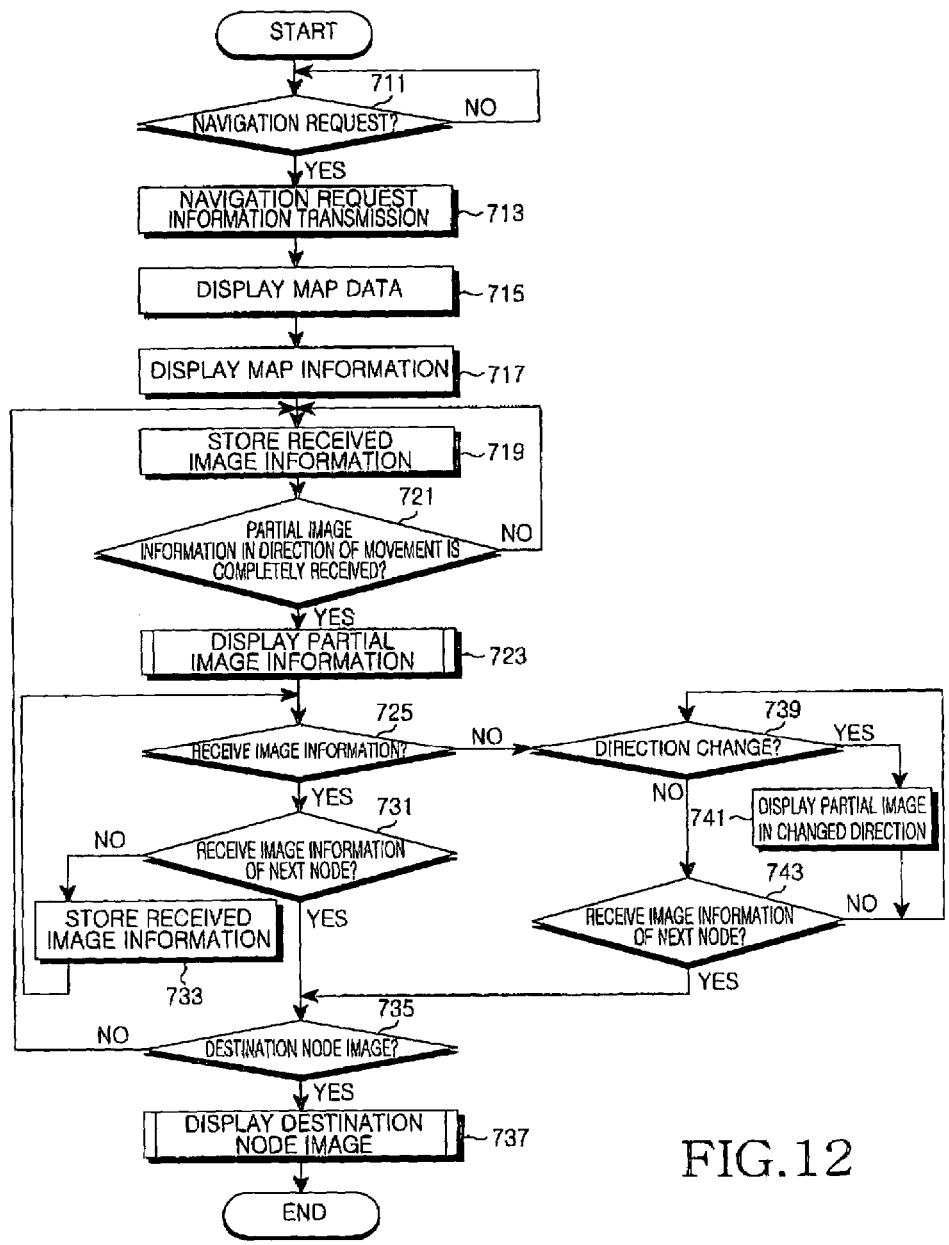
FIG. 12 is a flowchart illustrating a procedure for displaying the node image information transmitted by the mobile terminal as shown in FIG. 11.

The former method is employed when images within a limited angle are sequentially received and reproduced according to the direction of movement due to limitations in a data transmission bandwidth and a processing speed. The latter method is employed when priorities are given to images within a limited angle according to the direction of movement due to severe limitations in a data transmission bandwidth and a processing speed, the images are received according to the priorities, and the received images reproduced. For instance, when the mobile terminal 300 moves in the 6 o'clock direction in FIG. 5, the mobile terminal 300 may receive and reproduce only five images in 6, 5, 7, 4, and 8 o'clock directions in an upcoming intersection according to the priorities according to the direction of movement. FIGS. 11 and 12 each show procedures in which the information center 100 transmits the image information at each node, and the mobile terminal 300 receives the transmitted node message, according to the aforementioned methods.

Referring to FIG. 11, steps 611, 613, 615, 617, 619, 621, 623, 625, and 627, 635, 637 and 639 are equivalent to steps 411, 413, 415, 417, 419, 421, 423, 425, and 427, 435, 437, and 439 of FIG. 9. That is, when the mobile terminal 300 makes a request for the navigation, the information center 100 sets the path, transmits the map data, and then transmits the node message to the mobile terminal 300. Herein, the information center 100 analyzes the direction of movement of the mobile terminal 300, and then transmits the partial image information according to the direction of movement of the mobile terminal 300 at a corresponding node. Accordingly, the mobile terminal 300 receives and displays the partial image information in the direction of movement of the mobile terminal 300 at each node.

After transmitting the partial image information according to the direction of movement of the mobile terminal 300, the information center 100 receives position movement information according to the movement of the mobile terminal 300 in step 629. Then, the information center 100 determines whether the position movement information of the mobile terminal 300 is information representing a node pass in step 635. From the result of the determination, when the position movement is not a position movement according to the node pass, step 633 is performed. That is, the information center 100 transmits image information in another direction of the node. However, while a state of receiving the image information of the node, when the mobile terminal 300 passes through a corresponding node or approaches the corresponding node, the information center 100 detects the pass or approach in step 635, and step 619 is performed. That is, the information center 100 transmits the node message of the next node to the mobile terminal 300. That is, while the information center 100 transmits the next node message, the mobile terminal 300 approaches or passes through the node position of the current node message, the information center 100 stops transmitting the node message being currently transmitted and then transmits the node message of the next node to the mobile terminal 300.

In contrast, the mobile terminal 300 does not pass through the node position of the node message being currently transmitted, or approach the node position of the node message being currently transmitted within a predetermined distance, the information center 100 repeats step 625 to step 633 and transmits all node messages to the mobile terminal 300.

When the information center 100 transmits the node message as described above, the mobile terminal 300 receives the node message transmitted from the information center 100 and then displays image information through the procedure as shown in FIG. 12.

Referring to FIG. 12, steps 711, 713, 715, 717, 719, 721, 723, 725, 735, and 737 are equivalent to steps 511, 513, 515, 517, 519, 521, 523, 525, 535, and 537 of FIG. 10. That is, the mobile terminal 300 makes a request for the navigation, and receives and displays the map data and the partial image information of the node according to the direction of movement of the mobile terminal 300 transmitted from the information center 100. Herein, when the mobile terminal 300 detects the reception of the image information in step 725, and confirms the reception of the node message of the next node in step 731, step 719 is performed. That is, the mobile terminal 300 receives the node message of the next node. In other words, when the mobile terminal 300 receives the node message of the next node while receiving and displaying a node message of a certain node, the mobile terminal 300 receives and displays a message of a corresponding node. This is because the mobile terminal 300 passes through the next node or approaches the next node within a predetermined distance while a state of receiving the certain node message, and the information center 100 transmits the node message of the next node. Herein, the mobile terminal 300 detects the reception of the message of the next node in step 731, and step 719 is performed. That is, the mobile terminal 300 receives the node message of the next node and displays the image information of the next node.

However, when the information center 100 repeatedly transmits the node message with respect to the certain node, the mobile terminal 300 detects the transmission of the certain node message in step 731, and stores the received partial image information in step 733. Further, the mobile terminal 300 performs step 739, 741, and 743 and may display other partial image information of the received panorama image information.

Figure 13:
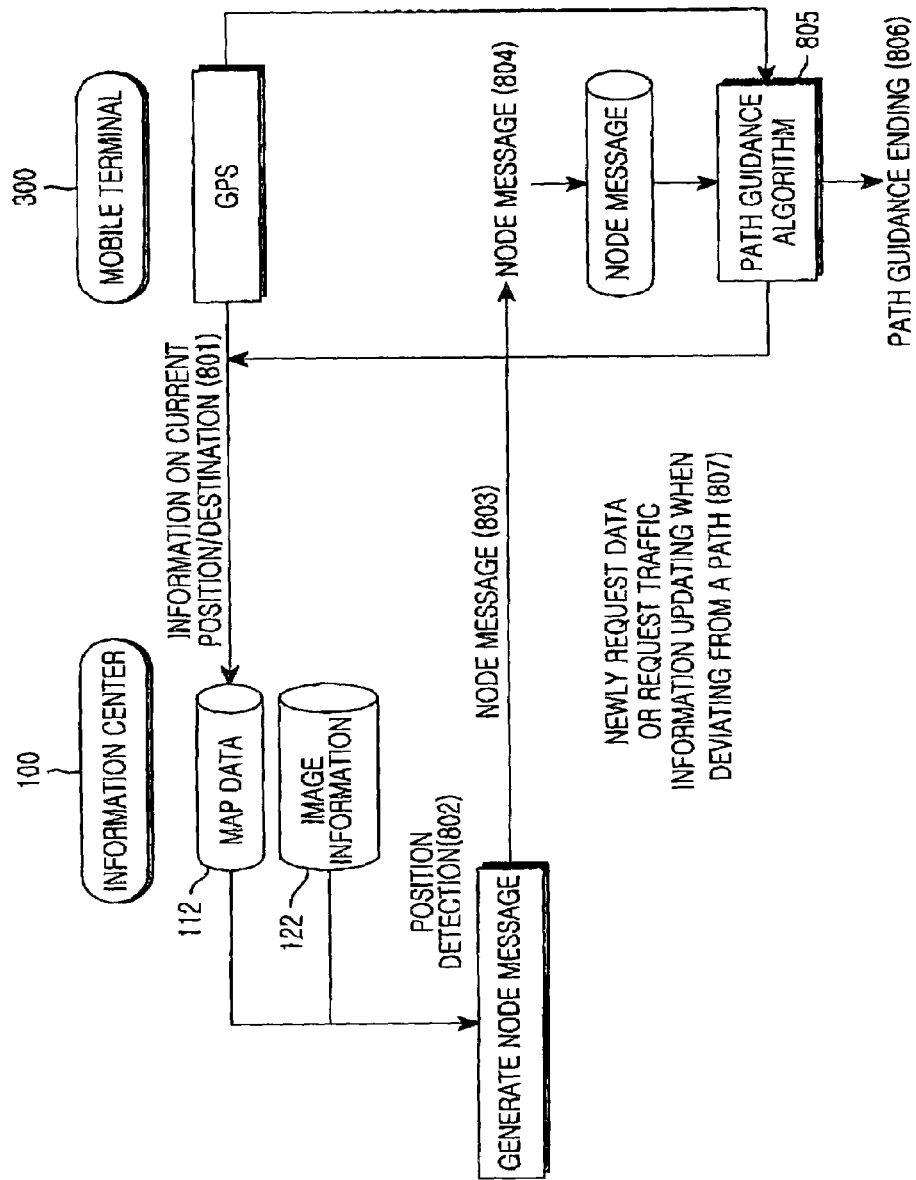
FIG. 13 is a view showing an operation procedure of a navigation system according to an embodiment of the present invention.

FIG. 13 is a view showing an operation procedure of a navigation system according to an embodiment of the present invention.

Referring to FIG. 13, in step 801, information on the current position and destination is transmitted from the mobile terminal 300 to the information center 100 through the wireless network 200. The information on the current position of the mobile terminal 300 is longitude and latitude coordinates obtained by the GPS receiver 312 contained therein, and the information on the destination may be facilities or an administrative section name of the destination input in the mobile terminal 300 and may be in the form of a text or a voice input by a user. Furthermore, the information on the destination may be the district category or the telephone number in addition to the name of the destination.

In step 802, the information center 100 receives the information on the current position and destination transmitted from the mobile terminal 300, detects the current position, and calculates the path in response to the reception. Herein, the information center 100 performs the current position detection operation by receiving the information on the current position (longitude and latitude) and the destination of the mobile terminal 300, finding geographical name and facilities information items, which coincide with the current position, in the map data storage unit 112, and converting the items into longitude and latitude coordinates. Further, in the path calculation operation, the information center 100 obtains the optimum path from the information on the current position and the destination of the mobile terminal 300 by means of the map data storage unit 112 and the image information storage unit 122. Herein, the obtained optimum path is converted to the node message for path guidance.

In step 803, the information center 100 transmits the node message to the mobile terminal 300 through the wireless network 200. Herein, the node message may have the same structure as that shown in FIG. 4. In step 804, the mobile terminal 300 receives the transmitted node message, and the received node message may be stored in the RAM 322, a internal memory, of the mobile terminal 300. Herein, the information center 100 gives a priority according to the direction of movement of the mobile terminal 300 when transmitting the node message, and sequentially transmits corresponding partial image information according to the given priority. In short, the information center 100 transmits the node message of the next node whenever the mobile terminal 300 passes a node. Then, the mobile terminal 300 receives the node message transmitted from the information center 100, and displays the image information of the next node whenever passing the node.

In step 805, the mobile terminal 300 checks its position at a predetermined time period, which is estimated by the stored node message, the GPS receiver 312, the gyro sensor 314, and the velocity sensor 316. Next, the mobile terminal 300 displays a direction, in which the mobile terminal 300 is to move, on the display unit 326, and allows voice guidance to be performed by performing a voice guidance function. Herein, the voice guidance may be received from the information center 100. Otherwise, the mobile terminal 300 includes a voice guidance IC therein, thereby performing simple voice guidance function by means of the voice guidance IC.

If the mobile terminal 300 deviates from a progressing path while step 805 is performed, the mobile terminal 300 may make a request for navigation for new path guidance or updating of path information to the information center 100 in step 807. That is, when it is determined that the mobile terminal 300 has deviated from the path while step 805 is performed, the mobile terminal 300 transmits its new position to the information center 100 and makes a request for transmission of newly constructed navigation data.

When a vehicle travels up to the destination input in step 801, the path guidance operation and the node image display operation with respect to the path are ended in step 806.

As described above, in an embodiment of the present invention, a mobile terminal confirms in advance real images of upcoming topographic features by means of current position information and the direction of movement of the mobile terminal received from a GPS, so that a panoramic view can be understood. Further, when displaying images of nodes, a panorama image may be used as image information. In addition, a general image may also be used as the image information. Further, according to the amount of data of the download image information and movement speed of the mobile terminal, image information in the direction of movement of the mobile terminal may be first downloaded from among the image information, and then displayed. Furthermore, when the downloaded image information of the node is the panorama image, image information in other directions different from the direction of movement of the mobile terminal may be displayed.

While the invention has been shown and described with reference to certain embodiments thereof, it should be understood by those skilled in the art that various changes in form and details may be made therein without departing from the spirit and scope of the invention as defined by the appended claims.

What is claimed is:

1. A method for transmitting a node message from an information center to a mobile terminal in a navigation system including the information center and the mobile terminal, the information center storing node image information on topographic features of a node, the node image information including partial image information according to a direction of movement of the mobile terminal, the information center including a database for storing the node message having the partial image information and a database for storing map data, the method comprising the steps of:

generating the node message for guiding a next node point whenever the mobile terminal reaches a node point;

confirming the direction of movement of the mobile terminal through the use of a sensor unit and transmitting partial image information of the node image information corresponding to the direction of movement of the mobile terminal; and sequentially transmitting partial image information of the node image information corresponding to a direction adjacent to the direction of movement of the mobile terminal after the image information in the direction of movement of the mobile terminal has been transmitted;

wherein the node image information comprises a panorama image obtained by photographing 360° of topographic features around the node, and the image information is divided into partial image information corresponding to each direction.

2. The method as claimed in claim 1, wherein the node image information includes 12 partial image information according to 12 directions of the node.

3. The method as claimed in claim 1, wherein the node message includes a node name, classification of roads, classification of links, and the node image information, the node image information comprises a panorama image obtained by photographing the topographic features around the node, and the image information is divided into partial image information corresponding to each direction of the node.

4. The method as claimed in claim 3, wherein the node image information includes 12 partial image information according to 12 directions of the node.

5. The method as claimed in claim 4, wherein the node point includes an intersection, a tollgate, an interchange, and a site around a destination.

6. The method as claimed in claim 1, further including a step of setting an optimum travel path from a current position to a destination of the mobile terminal, and transmitting the map data according to the set path, when there exists a request for navigation information including information on the current position and the destination of the mobile terminal transmitted from the mobile terminal, wherein the node message is transmitted.

7. The method as claimed in claim 1, further including a step of analyzing movement information received from the mobile terminal, and determining whether the mobile terminal has arrived at a node point.

* * * * *